Feb. 12, 1952    R. A. CAMPBELL    2,585,224
STONE CRUSHING DEVICE
Filed April 30, 1948    3 Sheets-Sheet 1
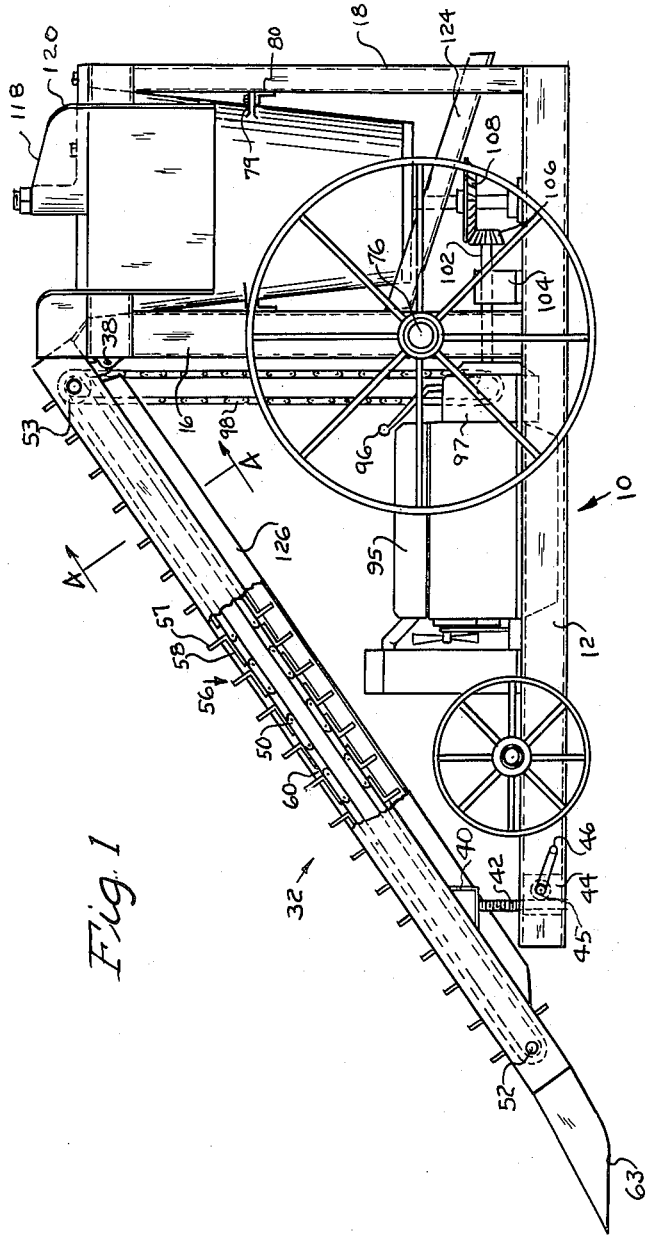
INVENTOR.
ROBERT A. CAMPBELL
BY
*W. A. Whiteley*
*Attorney*

Feb. 12, 1952     R. A. CAMPBELL     2,585,224
STONE CRUSHING DEVICE
Filed April 30, 1948     3 Sheets-Sheet 2
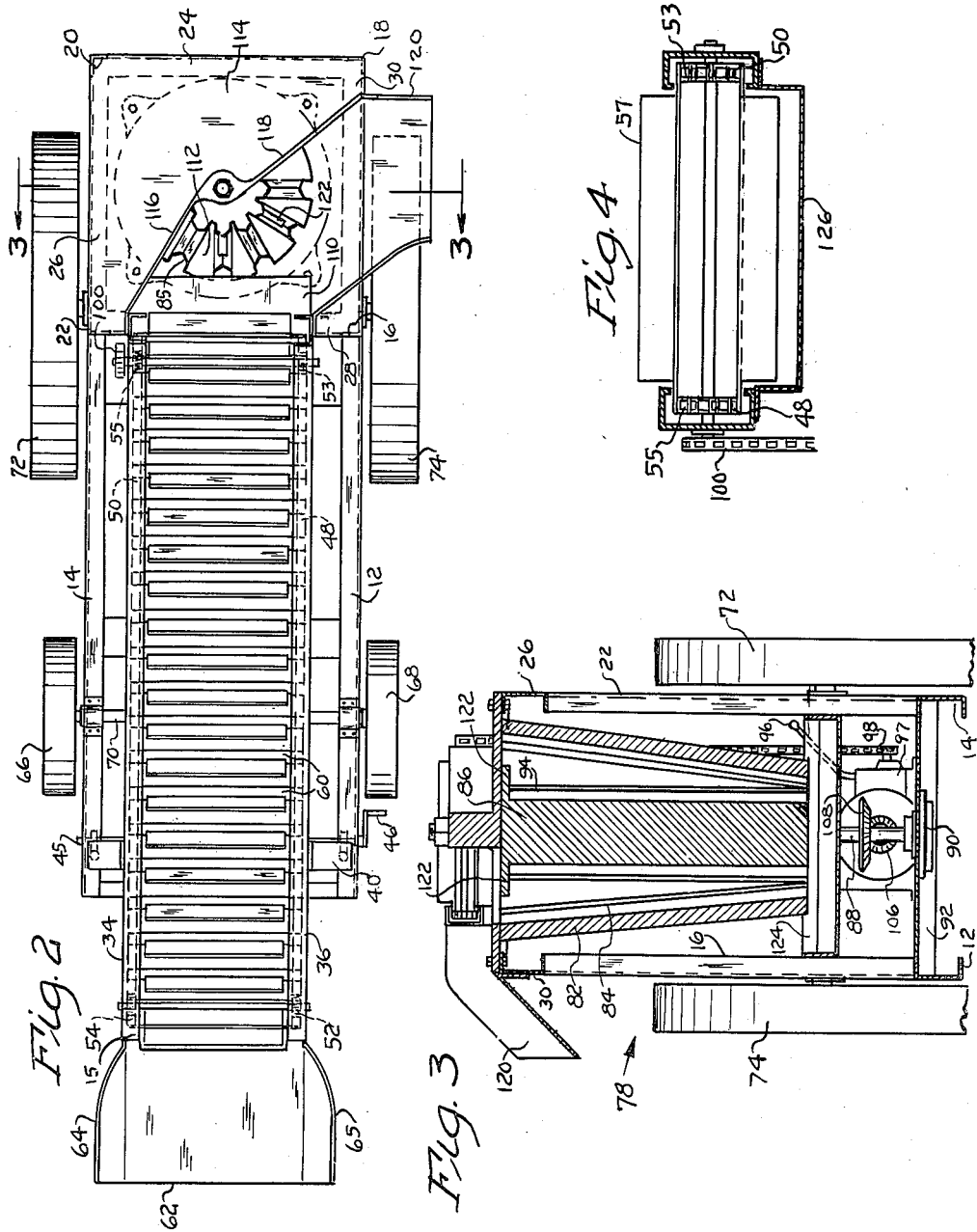
INVENTOR.
ROBERT A. CAMPBELL
BY
Attorney

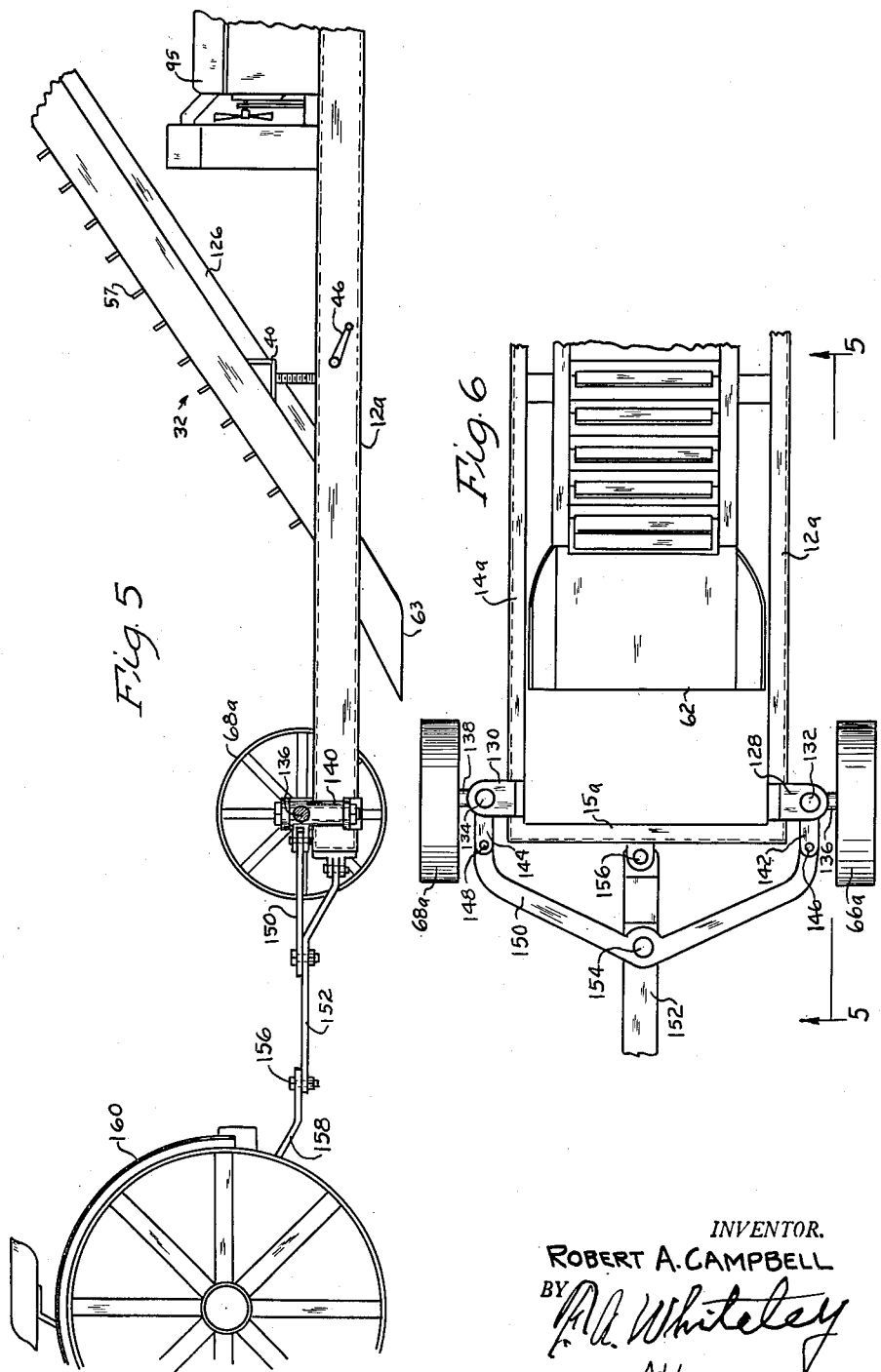

Patented Feb. 12, 1952

2,585,224

UNITED STATES PATENT OFFICE 2,585,224

STONE CRUSHING DEVICE

Robert A. Campbell, Glen Flora, Wis.

Application April 30, 1948, Serial No. 24,132

2 Claims. (Cl. 241—81)

My invention relates to improvements in a combination excavator and stone crushing device. In particular, it relates to a mobile mechanism for excavating field stones which are on or adjacent the surface of land intended for agricultural use, having means for classifying the stones, a crushing mill for pulverizing and dispersing the stones in a finely ground form back onto the surface of the land, and means for rejecting other stones which may be of too great a size to enter the crushing mill.

In certain geographical areas, the soil contains a great many natural stones resulting from glacial deposits, which may either be embedded in the soil or resting loosely on the surface of the soil. While such stones constitute an impediment to cultivation of the land, and as such are a nuisance, they may, nonetheless, be converted into one or more useful forms where they can be made to contribute to the fertility of the land, or at least be easily gathered so that they can be collected and used for various forms of construction. It is known that many forms of rocks or stones resulting from glacial deposits contain mineral matter in the form of water soluble salts such as the salts of phosphorus and iron, which are highly beneficial for agricultural purposes. In their natural state, the surfaces of these stones through countless years of having been in contact with natural waters have had any such salts removed therefrom by leaching. However, when such stones are broken or crushed to expose fresh surfaces, the water soluble salts on these newly formed surfaces are available to provide additional mineral material to the soil, and furthermore, the ground stones can enrich the soil to the extent that when mixed therewith they tend to aerate the soil which is also highly beneficial. On the other hand, numerous stones of this type which are of relatively large dimension can be used for building and construction purposes if they can be efficiently excavated and separated from the smaller stones and soil. In many parts of the country these natural stones are used for building walls and dwellings, and, therefore, they form a valuable article of commerce.

In the present invention, I have provided a mobile device including an excavator for gathering the stones which may be either resting loosely on the surface of the soil or embedded therein at or adjacent the surface thereof. After they have been gathered or excavated, the rocks or stones are conveyed by an elevator to a suitable crushing mill which forms a part of the device, and during the period of movement on the elevator, provision is made for the removal of any free soil or fine gravel, so that in effect the crusher acts only on the stones which have been freed of such fine material. As there is likelihood of the excavator picking up stones which are larger than can be handled by the crusher, means are provided for shunting these larger stones away from the crusher and diverting them through a passage or chute to the side of the device where they can be dumped into a suitable container or truck travelling alongside of the device, or dropped to the surface of the earth where they can be picked up later. The smaller stones that pass into the crusher are ground to a suitable degree of fineness, and means are provided for distributing the finely ground stone to the soil in a form in which it may be plowed into the soil or allowed to remain on the surface for leaching action.

An object of my invention is to provide a mobile mechanism for gathering stones from the surface of soil and classifying such stones into two or more groups, one group of which is rejected in a manner that the stones may be gathered for a particular use, while the other group is directed into a crushing mill where it is ground and re-distributed to the soil in such a manner that it will be of value to the soil.

Another object is to provide a mobile mechanism for gathering stones from the surface of the soil where they are a nuisance, and grinding and returning them the soil in a form in which they are beneficial to the soil.

Another object is to provide a mobile device for excavating stones from the soil together with means for classifying the excavated material into three groups, one of which consists of loose soil or gravel which is immediately returned in rear of the excavator, a second of which consists of intermediate sized stones which are ground and returned to the soil in a form in which they tend to enrich the soil, and a third group consists of larger stones that are rejected in such a manner that they may be easily collected for constructional use.

A further object is to provide a mobile excavator and stone grinding mill for gathering field stones from the soil, together with an elevator extending between the excavator and the mill that is constructed in such a manner as to dispose of the soil and finely divided matter during the period of elevation, together with means for returning the ground material to the soil, and further means cooperable with the mill for rejecting the stones of a size greater than can be normally crushed within the mill.

Other and further objects may become apparent from the following description and claims and in the appended drawings in which:

Fig. 1 is a side elevation of the device forming the present invention with parts broken away to show internal construction;

Fig. 2 is a top plan view of the structure shown in Fig. 1;

Fig. 3 is a section taken on the lines 3—3 of Fig. 2 looking in the direction of the arrows;

Fig. 4 is a section taken on the lines 4—4 of Fig. 1; and

Figs. 5 and 6 illustrate a modified structure.

Referring now to the several figures of the drawing, the invention will be described in detail. General reference numeral 10 shows a combination excavator and crushing mill having a frame member consisting of a pair of horizontal beams 12 and 14, joined by cross-member 15, Fig. 2. Towards the rear of the structure and extending upwardly from beams 12 and 14 are a plurality of vertical uprights 16, 18, 20 and 22, which are joined at their upper ends by a plurality of angle irons 24, 26, 28 and 30 so as to form a substantially rectangular hollow frame.

An elevator indicated by general reference numeral 32 and consisting of a pair of lateral members 34 and 36 are pivotally mounted at 38 on angle iron 28. Adjacent their other end, members 34 and 36 rest on an angle iron 40 that is rendered adjustable in its position by a heavy threaded bolt 42 which may be rotated through suitable gearing provided in a box 44 that is in turn operated by a rod 45 having a manually operable crank handle 46.

The elevator 32 also consists of a pair of endless bands or chains 48 and 50, see Figs. 1, 2 and 4, that operate over sprocket gears indicated at 52, 53, 54 and 55. Extending between the bands or chains 48 and 50 are a plurality of angle iron slats indicated by the general reference numeral 56 and consisting of an upwardly extending portion 57 and a rearwardly extending portion 58. Of particular importance in this invention is the fact that the portion 58 of any one slat 56 is spaced from the upwardly extending portion 57 of the next adjacent slat so as to form an opening 60 between each slat. The opening 60 extends across the entire width of elevator 32 and forms a means of classifying material as the same is elevated in that fine material is permitted to pass through the several openings 60 between each of the slats 56.

Secured to the lower or forward end of elevator 32 is an excavating scoop 62 which, as shown in Fig. 1, has a lower flat forward portion 63 and inwardly tapered side walls 64 and 65, shown in Fig. 2 for directing material onto elevator 32.

The device 10 is intended to be mobile and for this purpose a pair of front wheels 66 and 68 are suitably journaled to a shaft 70 that extends between the frame members 12 and 14. Likewise, a pair of rear wheels 72 and 74 are suitably journaled on a shaft 76 that extends between the uprights 16 and 22. While the device might be self-propelled, in the present instance, a prime mover, not shown, is provided, and the wheels are merely to permit the device 10 to be readily moved over the surface of the ground.

As shown in the several views of the drawing, a stone crushing mill indicated by the general reference numeral 78 is suitably supported by brackets 79 and 80 onto the several upright members 16, 18, 20 and 22. The mill proper consists of a thick-walled chamber 82 which is open at both its upper and lower extremities, and which tapers inwardly from its upper extremity to its lower extremity as clearly shown in Fig. 3. Within the interior of chamber 82 are a plurality of heavy rib members 84 which, as shown in Fig. 2, are provided with a pointed edge 85, and as clearly shown in Figs. 2 and 3, extend from the top to the bottom of chamber 82. A heavy cylindrical rotor 86 is supported within the interior of chamber 82 on a shaft 88, which is in turn journaled in a heavy thrust bearing 90 on a cross member 92 that extends between the horizontal frame member 12 and 14. Cylinder 86 also has a plurality of heavy ribs 94 on its outer surface, which cooperate with the ribs 84 of chamber 82 to form a grinding surface.

To provide movement of the elevator 32 and the cylinder 86, a suitable source of power herein illustrated as an internal combustion engine 95, is suitably supported on the horizontal frame members 12 and 14 beneath the elevator 32. The engine 95 is conventional in all aspects and is provided with a control lever 96 for controlling a transmission 97 through which power is conveyed to an endless band or chain 98 and a suitable sprocket gear 100 to the elevator 32, and by a shaft 102 which is journaled at 104 to a gear 106 which meshes with a gear 108 on shaft 88 to provide movement for cylinder 86.

Referring now to Fig. 2, an apron or pan 110 extends from beneath the upper end of elevator 32 to the mill 78 for directing material into the space indicated at 112 forming the interior of the grinding mill. Extending partially across the top of mill 78 is a cover structure 114 which carries a first vertical member 116 for directing the aggregate from pan 110 into the space 112. Also extending from cover 114 is a second vertical member 118 that extends to a chute 120 shown in Figs. 2 and 3. As shown in Figs. 2 and 3, on every other rib 94 of cylinder 86 is a short projection 122. The projections 122 cooperate with the vertical member 118 for moving large pieces of aggregate that are of such dimension that they cannot enter the space 112, away from the top of the mill and down chute 120.

As shown in Figs. 1 and 3, a chute 124 is suitably supported on the several upright members 16, 18, 20 and 22 beneath mill 78 for catching finely ground aggregate coming from the mill and directing the same in a downward direction to the ground in rear of the structure.

As best seen in Fig. 1, an elongated pan 126 is supported on the lower side of elevator 32 and serves to catch the small aggregate passing through the openings 60 and directing the same towards the ground immediately in rear of scoop 62 under the influence of gravity and aided by the slats 56 situated on the lower part of the elevator.

For simplicity of illustration, no attempt has been made to show a steering mechanism in conjunction with Figs. 1 and 2 for the reason that the structure may be suitably coupled to a prime mover in any one of a number of ways, each of which would require a different type of steering mechanism.

However, in view of the fact that it is desirable to show one form of coupling the structure 10 to a prime mover, such as a tractor, a preferred means is shown in Figs. 5 and 6. In this modification the channel beams 12a and 14a extend beyond the scoop 62 and are joined on their forward end by the cross beam 15a. A pair of lugs 128 and 130 are secured on the outer sides of beams 12a and 14a towards the front end thereof. Within each of the lugs 128, 130 is a vertically positioned pin indicated at 132, 134. The wheels 66a and 68a are mounted on stub axles 136, 138 which have formed integral therewith tubular portions 140, Fig. 5, that surround the pins 132, 134, so as to enable the axles and wheels to rotate axially about the pins 132, 134. Rigidly connected to portions 140 and extending forwardly therefrom parallel with the beams 12a, 14a are a pair of arms 142, 144 which are pivotally joined at 146, 148 to a yoke 150.

A drawbar 152 is pivotally joined at 154 to yoke 150 and is also pivotally joined at 156 to the cross beam 15a. Drawbar 152 is adapted for connection at 156 to another drawbar 158 forming a part of a conventional tractor 160.

The operation of the device will now be explained in detail. When the device is to be placed in operation, the engine 95 is started and the control lever 96 moved to a position to transmit power through the transmission 97 to chain 98 to operate the elevator 32 and through the shaft 102 and gears 106 and 108 to the shaft 88 to cause relative movement of the grinding cylinder 86 with respect to the stationary grinding chamber 82. Since the engine 95 is used only for the operation of the mill and the elevator, the same are in continuous operation at all times.

The device is normally moved over the ground by a prime mover such as a tractor, and one means of coupling the tractor to the device is shown in Figs. 5 and 6, although it should be understood that any other conventional means of connecting the prime mover to the structure 10 is within the scope of my invention. With the coupling shown in Figs. 5 and 6, the power from tractor 160 is applied through drawbars 158, 152 to cross beam 15a of the frame, although drawbar 152 is also pivotally connected at 154 to the yoke 150 to provide a means of steering device 10. When the tractor is moving in a straight forwardly direction, the pull is transmitted through drawbar 152 directly to the frame. When, however, the tractor turns, the torque is transmitted to yoke 150, which will be caused to shift on its pivots 146, 148, thereby causing the wheels 66a and 68a to turn in unison so that the structure 10 will suitably follow the tractor.

Crank handle 46 is adjusted so as to properly place scoop 62 with respect to the ground. In some instances it will be desirable only to gather stones that are relatively loose on the surface of the ground. Under other conditions, it may be desirable to use scoop 62 as an excavating device and in that instance it is adjusted so as to bite into the ground for a suitable distance and convey everything that is excavated by it to the elevator 32. Elevator 32 rotates in a clockwise direction, as shown in Fig. 1, and the aggregate, consisting of stones and soil, are carried from scoop 62 upwardly in the direction of the top of the mill 78. The several slats 56 are shown as being separated from each other for a distance of substantially five inches and in such an arrangement the open spaces 60 between the portion 58 of one slat and the portion 57 of the next succeeding slat will be about one inch, as shown herein. This distance is sufficient to permit loose soil and small pebbles or gravel to fall through the elevator and descend to the pan 126 where the several slats which are moving downwardly will carry the material so deposited to the ground immediately in rear of scoop 62. Thus, it will be understood that in the process of elevating the aggregate, a first step of classification of the aggregate is accomplished to remove one fraction thereof. As the coarser material moves upwardly on the elevator it is pushed across pan 110 into the open space 112 between the cylindrical rotor 86 and the stationary chamber 82. That portion of the aggregate which is sufficiently small to enter this space will be ground between the ribs 84 and 94 of the grinding mill as it descends in the mill. However, certain of the stones may be larger than the distance between ribs 94 and ribs 84, and would, therefore, be too large to be successfully ground in the mill. The several projections 122 on every other rib 94 are provided to give movement to these large stones and in the course of rotation of cylinder 86, which would be in a counterclockwise direction as shown in Fig. 2, the large stones are brought into contact with the vertical member 118 and slidably moved thereby to chute 120 where they will fall to the ground or to any suitable container such as a truck that may be provided adjacent the structure. Since one of the principal purposes of the device is to crush the rock into fine aggregate and immediately return it to the land, the finely ground material passing from mill 78, descends through a chute 124 where it is spread in a relatively broad layer across the surface of the land as the device is moved.

The advantages of my device are that I provide a single mechanism having combined means for excavating or gathering rocks from rock strewn soil and classifying the material so gathered into three groups, one of which is immediately returned to the soil, the second of which is pulverized and returned to the land to provide beneficial results, and the third of which is rejected in the course of the operation in such a manner that it might be independently collected for other purposes.

The invention is not restricted to the single illustration, but is defined in the terms of the appended claims.

I claim:

1. In a device of the class described, in combination, a frame, a vertical open-topped chamber supported by said frame, the interior surface of said chamber tapered inwardly from the open end and supporting a plurality of axially extending projections, a rotor within the axis of said chamber carrying a plurality of laterally extending projections which cooperate with the projections on the interior surface of the chamber to form a grinding mill when the rotor is moved relative to the chamber, there being an annular opening at the top of the mill between the chamber and the rotor for the admission of an aggregate between said projections, means supported by the frame for moving aggregate to the top of the mill, means supported by the frame for driving the rotor, a plurality of horizontally extending ribs on the upper end of the rotor and projecting in the direction of the chamber to engage oversize elements of the aggregate, a chute extending outwardly from one side from the top of the mill for receiving and disposing of the oversize elements, and a barrier extending from adjacent the axis of the rotor to one side of the chute in relatively close spaced relation to the horizontally extending ribs on the motor for engaging the oversize elements carried by the ribs and discharging the same into the chute.

2. In a device of the class described, in combination, a mobile frame, a vertical open-topped chamber supported by said frame, the interior surface of said chamber tapering inwardly from the upper end to the lower end and supporting a plurality of axially extending projections, a rotor extending vertically through the axis of said chamber and carrying a plurality of laterally extending projections which cooperate with the projections on the interior surface of the chamber to form a grinding mill when the rotor is moved relative to the chamber, there being an annular opening at the top of the mill between the chamber and the rotor for the admission of an aggregate between said projections, means for rotatably driving the rotor relative to the chamber, means supported by the frame for moving aggregate to the top of the mill, a first chute carried by the frame beneath the mill for receiving ground aggregate from the mill and discharging the same, a plurality of horizontally extending ribs on the top of the rotor which project outwardly over the opening between the chamber and the rotor to engage oversize elements of the aggregate, and a second chute extending outwardly from one side of the top of the mill, a portion of said chute extending inwardly over the rotor to a point adjacent the axis thereof and being in relatively close spaced relation to the horizontally extending ribs and forming a barrier which engages the oversize elements of the aggregate and discharges the same into the said last named chute.

ROBERT A. CAMPBELL.

REFERENCES CITED

The following references are of record in the file of this patent:

UNITED STATES PATENTS

| Number | Name | Date |
| --- | --- | --- |
| 104,537 | Baker | June 21, 1870 |
| 120,972 | Hughes | Nov. 14, 1871 |
| 234,027 | Grant | Nov. 2, 1880 |
| 703,461 | Petter | July 1, 1902 |
| 1,462,096 | Wiertz | July 17, 1923 |
| 1,525,450 | Kneebone | Feb. 10, 1925 |
| 1,941,770 | Welsford et al. | July 2, 1934 |
| 2,114,078 | Jackson | Apr. 12, 1938 |
| 2,201,493 | Jorgensen | May 21, 1940 |